United States Patent [19]

Duckett

[11] 4,306,398

[45] Dec. 22, 1981

[54] AIRTIGHT AND DEFORMABLE SEALING GASKET FOR GREENHOUSE VENT CLOSURES

[76] Inventor: John W. Duckett, 4905 Ranch Rd., Tiburon, Calif. 94920

[21] Appl. No.: 145,593

[22] Filed: May 1, 1980

[51] Int. Cl.³ ............................ F04B 1/12; F04B 7/02
[52] U.S. Cl. ......................................... 52/394; 49/483
[58] Field of Search ............. 277/22, DIG. 6; 49/483; 52/394, 397, 302

[56] References Cited

U.S. PATENT DOCUMENTS

| | | | |
|---|---|---|---|
| 1,634,987 | 7/1927 | Fedder | 52/394 |
| 2,055,471 | 9/1936 | Balfe | 277/DIG. 6 |
| 2,074,497 | 3/1937 | Voigt | 52/394 |
| 3,589,070 | 6/1971 | Hansen | 49/483 |
| 4,057,941 | 11/1977 | Schwartz | 52/302 |

Primary Examiner—Robert I. Smith
Attorney, Agent, or Firm—Phillips, Moore, Weissenberger, Lempio & Majestic

[57] ABSTRACT

A greenhouse has a deformable sealing gasket secured at the edge of a fixed roof thereof to engage an edge of a vent closure for sealing an air gap between the edges, when the vent closure is in its closed position.

5 Claims, 3 Drawing Figures

AIRTIGHT AND DEFORMABLE SEALING GASKET FOR GREENHOUSE VENT CLOSURES

DESCRIPTION

1. Technical Field

This invention relates generally to a greenhouse and more particularly to a deformable gasket adapted to provide an airtight seal upon closing of a vent closure of the greenhouse.

2. Background Art

A recurring problem confronting greenhouse keepers is one of maintaining the climatic conditions, including temperature and humidity, suitable for growing plants and the like. A standard greenhouse includes one or more vent closures movably mounted on the roof thereof for opening to expose the interior of the greenhouse to ambient climatic conditions during the daytime, upon opening thereof, and for closing during nighttime to control such interior conditions by use of heaters and the like. Closing of the vent closure will normally provide an undesirable air gap substantially throughout the length of the greenhouse, between adjacent edges of the vent closure and the fixed roof of the greenhouse.

Also, when the frame structure of the greenhouse is constructed from metallic components, angles employed at the above edges may tend to bend, which further increases the size of the undesirable air gap. In addition to making it difficult to maintain the desired climatic conditions within the greenhouse, the air gap will function to leak-out heated air, creating substantial energy losses.

3. Disclosure of Invention

This invention overcomes the above, briefly described problem by providing an elongated gasket means secured to an edge of a fixed roof of a greenhouse for deforming into airtight contact with the edge of a vent closure to close an air gap between the edges when the vent closure is in its closed position.

BRIEF DESCRIPTION OF THE DRAWING

Other objects and advantages of this invention will become apparent from the following description and accompanying drawings wherein.

BEST MODE OF CARRYING OUT THE INVENTION

Figure 1:
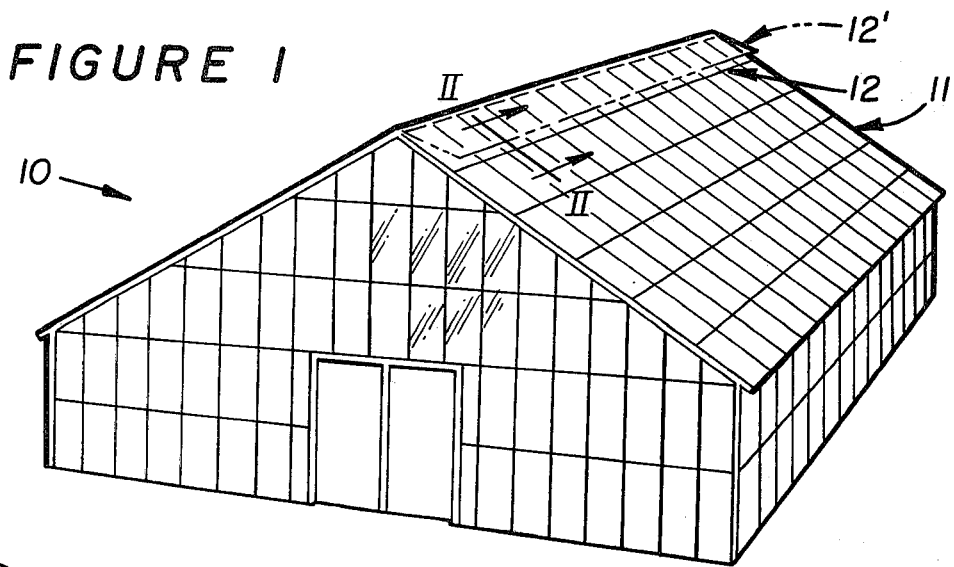
FIG. 1 is a perspective view of a greenhouse having a vent closure movably mounted thereon.

FIG. 1 illustrates a greenhouse 10 comprising a standard frame structure having a plurality of windows secured thereon in a conventional manner. The greenhouse includes a stationary roof 11 and a vent closure 12 adapted to be opened to its 12' position in a conventional manner. In particular, the vent closure may be hinged on the roof and moved between its illustrated closed and open positions by standard control apparatus (not shown) within the greenhouse.

Figure 2:
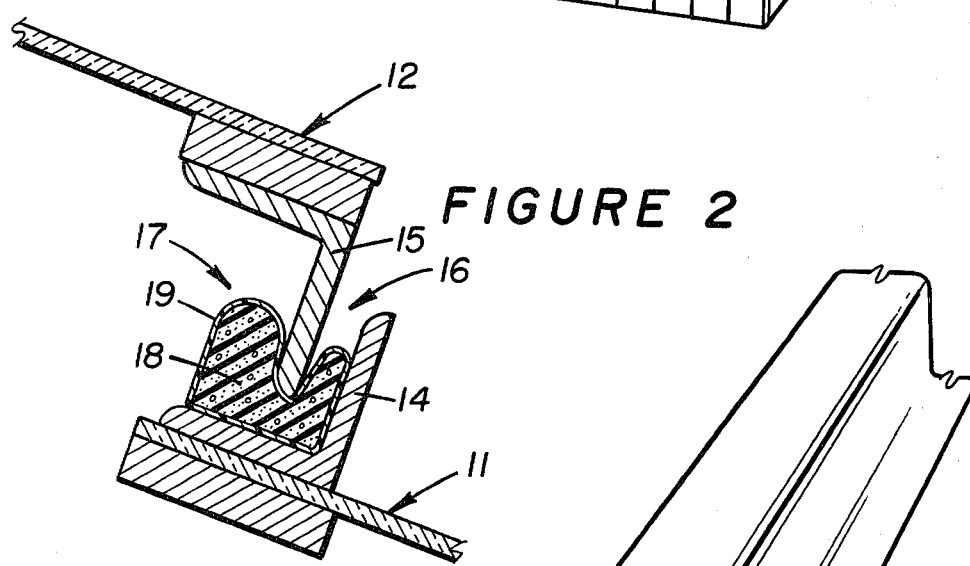
FIG. 2 is an enlarged sectional view, taken in the direction of arrows II—II in FIG. 1, illustrating an elongated gasket secured to an edge of a fixed roof of the greenhouse and deformed into airtight contact with an edge of a vent closure upon closing thereof.

Referring to FIG. 2, stationary roof 12 terminates at an edge having an angle 14 secured thereon to extend the full length of the greenhouse. In this application, the frame structure of the greenhouse may be constructed of metallic frame members, including angle 14, which may be composed of aluminum, for example. Vent closure 12 terminates at an edge having an aluminum angle 15 secured thereon to form a gap 16 between the edges of the vent closure and the roof when the vent closure is in its illustrated closed position. An elongated gasket means 17 is secured to the edge of roof 12 for deforming, as illustrated, into airtight contact with the edge of the vent closure to close air gap 16 when the vent closure is in its closed position.

As discussed above, in the absence of gasket means 17, the climatic conditions within the greenhouse could not be closely controlled and substantial heat losses would occur. In addition, angles 14 and 15 are subject to deformation resulting in substantial enlargement of air gap 16, which extends the full length of the greenhouse.

Figure 3:
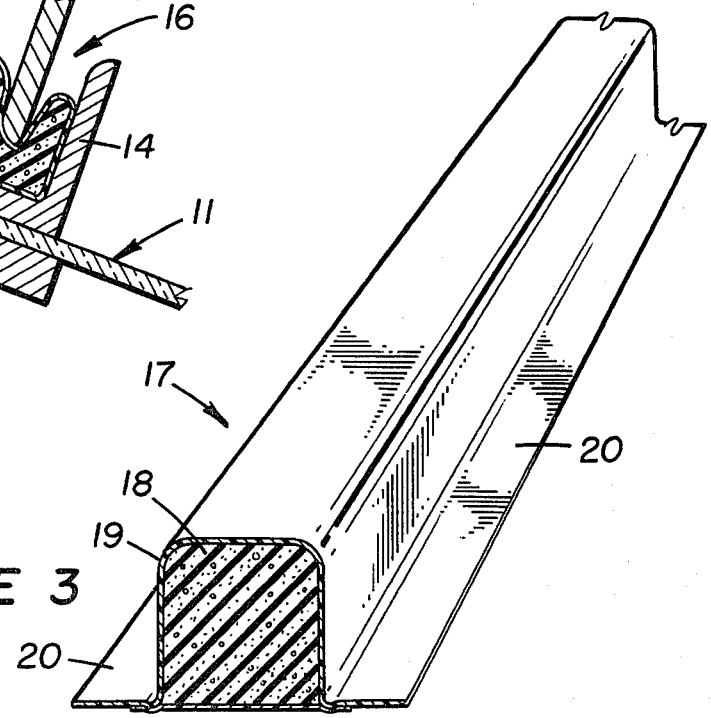
FIG. 3 is a perspective view of a section of the gasket.

Referring to FIG. 3, gasket means 17 preferably comprises a foam filler 18 encapsulated and sealed within a flexible thermoplastic outer casing 19. Filler 18 may be composed of any standard insulating-type foamed plastic material in sheet or pad form which will further exhibit the desired softness and elasticity to be deformed, as shown in FIG. 2, and spring-back into its original form illustrated in FIG. 3. Outer casing 19 may be composed of any standard flexible, tough thermoplastic material, preferably exhibiting ultraviolet absorbers for increasing its service life when exposed to the sun. The precise compositions of filler 18 and casing 19 and their physical dimensions will, of course, depend on the particular greenhouse application under consideration.

When gasket means 17 is secured in place on a metallic frame structure of a greenhouse, employing angle 14 therein, it may be secured on the angle by any standard adhesive suitable for this purpose. As shown in FIG. 3, when the frame structure of the greenhouse is composed of wood, for example, gasket means 17 may be formed to include a pair of laterally extending flaps 20 structurally integrated with casing 19 to aid in securing the gasket means to the frame by use of staples, nails, or the like.

I claim:

1. In a greenhouse having a stationary roof defining an elongated edge and a vent closure defining an elongated edge and movably mounted between an open position and a closed position wherein the edges of said roof and said vent closure define an elongated air gap therebetween, the improvement comprising an elongated gasket means secured to the edge of said roof for deforming into airtight sealing contact solely with the edge of said vent closure to close said air gap when said vent closure is in its closed position and the edge of said vent closure is moved downwardly into compressed sealing engagement with said gasket means, said gasket means including a pair of laterally disposed flaps extending outwardly and longitudinally along opposite sides of said gasket means and adapted for securance to a frame of said greenhouse.

2. The greenhouse of claim 1 wherein said gasket means includes a foam filler encapsulated and sealed within a flexible outer casing.

3. The greenhouse of claim 1 wherein said gasket means is adhesively secured to the edge of said roof.

4. The greenhouse of claim 1 wherein the edge of said vent closure is formed on an edge of an angle compressed downwardly into sealing engagement with said gasket means when said vent closure is in its closed position.

5. The greenhouse of claim 4 wherein said gasket means is secured within another angle, secured on the edge of said roof.

* * * * *